United States Patent [19]

Bly

[11] 4,299,864
[45] Nov. 10, 1981

[54] METHOD OF MAKING VISIBLE LIGHT TO FAR INFRARED TRANSDUCER

[75] Inventor: Vincent T. Bly, Alexandria, Va.

[73] Assignee: The United States of America as represented by the Secretary of the Army, Washington, D.C.

[21] Appl. No.: 125,405

[22] Filed: Feb. 28, 1980

[51] Int. Cl.³ ............................................. G02F 2/02
[52] U.S. Cl. .................................... 427/160; 250/493
[58] Field of Search ......................... 427/160; 250/493

[56] References Cited

U.S. PATENT DOCUMENTS 3,735,137  5/1973  Bly .................................. 250/495 X
4,178,514  12/1979  Bly .................................. 250/495 X

Primary Examiner—James R. Hoffman
Attorney, Agent, or Firm—Nathan Edelberg; Milton W. Lee; Aubrey J. Dunn

[57] ABSTRACT

A visible light absorbing and far infrared radiation emitting membrane is inclosed in an evacuated cell. The membrane consists of a thin insulating film coated with an optical black made from gold alloyed with a small percentage of nickel, copper or palladium. The gold alloy black is deposited in a soft vacuum inert except for a trace of oxygen.

2 Claims, 2 Drawing Figures

METHOD OF MAKING VISIBLE LIGHT TO FAR INFRARED TRANSDUCER

The invention described herein may be manufactured, used, and licensed by the U.S. Government for governmental purposes without the payment of any royalties thereon.

BACKGROUND OF THE INVENTION

1. Field of the Invention

This invention is in the field of image converters, and in particular, is concerned with visible to far infrared transducers. Such transducers are used to provide high-resolution, wide field of view, dynamic or static images in the far infrared spectrum. The images are needed for the testing of such far infrared devices as image converters, missile trackers, etc.

2. Description of the Prior Art

To date, there has been little activity in the art, so far as visible to infrared converters are concerned. As far as he knows, the present inventor's own patented devices are the only ones currently existing. The devices are disclosed in U.S. Pat. Nos. 3,735,137 of May 1973 and 4,178,514 of Dec. 11, 1979. The instant invention is an improvement on the invention in U.S. Pat. No. 4,178,514.

SUMMARY OF THE INVENTION

The instant invention is a visible light to infrared radiation converter consisting of a thin insulating film coated with a thin metallic black layer and inclosed in an evacuated housing, and the method of making such a converter. The black layer is formed on the film (in a soft vacuum, inert except for a trace of oxygen) from gold black with a slight amount therein of some other metallic black such as nickel, copper or palladium.

DESCRIPTION OF THE PREFERRED EMBODIMENTS OF THE INVENTION

Figure 1:
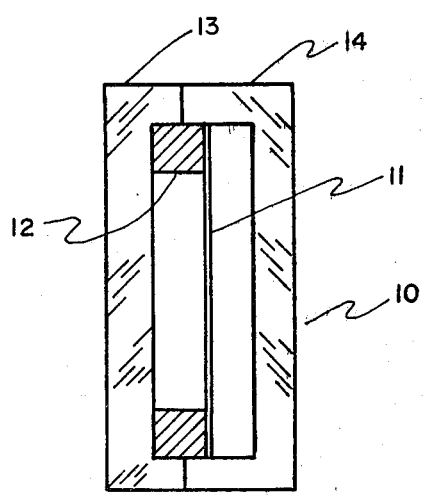
FIG. 1 is a sectional view of the transducer of the invention.
Figure 2:
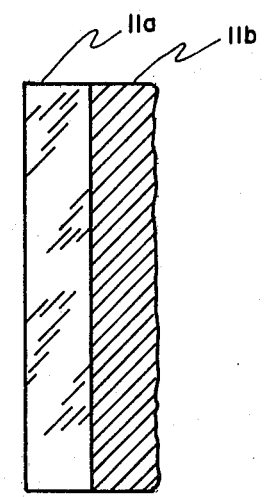
FIG. 2 shows details of the transducer film and coating.

The invention may be best understood when taken in conjunction with the drawings, in which reference numeral 10 in FIG. 1 generally designates the transducer of the invention. This transducer consists of transducer membrane 11 supported by ring 12. As can be seen, 11 and 12 are contained within transparent housing parts 13 and 14. FIG. 2 shows details of membrane 11 of FIG. 1. This membrane consists of a thin film 11a of an insulating film such as cellulose nitrate, polyvinyl alcohol, paralene, polymethyl metharcylate, vinyl formal copolymer, polyvinyl chloride, or aluminum oxide. This film may be on the order of 500A (200–2000A) thick. On film 11a is a thin layer 11b of gold black made from a gold alloy with a trace (1% to 5%) of copper, nickel, palladium, or some other heavy metal having a boiling point temperature close to that of gold. The density of layer 11b may be on the order of $80 \times 10^{-6}$ gm/cm$^2$.

METHOD OF INVENTION

This invention is made by a technique similar to the method described in my previous U.S. Pat. No. 4,178,514. Film 11a may be formed as described in lines 47–54 in column 2 of the said patent. However, the manner by which the gold black of the instant invention is deposited is different from that patent. Specifically, as mentioned above, gold alloyed with a trace (1% to 5%) of metals such as copper, nickel, or palladium is used as the metallic black source. Instead of an inert gas at a soft vacuum pressure as usually employed in prior art methods upon which the patent is based, a predetermined atmosphere such as a mostly inert soft vacuum (nigrogen or helium) with a trace of oxygen is used. The vacuum may have a pressure on the order of 1–3 torrs and with the oxygen on the order of 0.01%. The gold alloy black is deposited to a density on the order of $80 \times 10^{-6}$ gm/cm$^2$ ($30$–$150 \times 10^{-6}$ gm/cm$^2$) as previously described. The use of the gold alloy and trace of oxygen produces a transducer with superior characteristics to the prior transducer. Specifically, the gold alloys yield optical blacks with substantially higher usable temperature ranges than a pure gold black. Also, the oxygen in the atmosphere during black depositation substantially increases the sheet resistance of the black layer (and decreases thermal conductivity). These superior characteristics give a transducer having a greater thermal dynamic range and an improved resolution, compared to the transducer(s) of my previous patent.

I claim

1. A method of making a visible-to-infrared transducer including the steps of
    (a) preparing a thermally insulating film on the order of 500A thick on a supporting structure;
    (b) placing the film-structure combination in a soft inert vacuum with a trace of oxygen atmosphere;
    (c) depositing onto said film while in said atmosphere a layer of a radiation absorber to a density on the order of $80 \times 10^{-6}$ gm/cm$^2$;
    (d) removing said combination from said atmosphere;
    (e) mounting said combination in an air-tight housing; and (f) evacuating said housing.

2. The method as recited in claim 1 wherein said radiation absorber is gold black with a trace of either copper black, nickel black, or palladium black therein.

* * * * *